United States Patent [19]
Garza

[11] Patent Number: 6,145,400
[45] Date of Patent: Nov. 14, 2000

[54] RACK AND PINION STEERING GEAR FOR MOTOR VEHICLE

[75] Inventor: Carlos F. Garza, Chihuahua, Mexico

[73] Assignee: Delphi Technologies, Inc., Troy, Mich.

[21] Appl. No.: 09/270,561

[22] Filed: Mar. 16, 1999

[51] Int. Cl.$^7$ ..................................................... F16H 1/04
[52] U.S. Cl. ................................................ 74/422; 384/37
[58] Field of Search ........................ 74/422, 498; 384/37

[56] References Cited

U.S. PATENT DOCUMENTS 4,640,148  2/1987  Hasegawa ................................. 74/422

*Primary Examiner*—Dirk Wright
*Attorney, Agent, or Firm*—Edmund P. Anderson

[57] ABSTRACT

A new and improved rack and pinion steering gear including a housing, a rack bar having a rack gear thereon, and pinion head having a pinion gear thereon. The pinion head is supported on the housing for rotation as a unit with a steering hand wheel. The rack bar is supported on the housing for back and forth linear translation by a sleeve bearing and by a thrust bearing behind the rack bar opposite the pinion gear. The rack and pinion gears cooperate in converting manual effort applied at the steering hand wheel into linear thrust on the rack bar. Lateral separation between the rack gear and the pinion gear is "actively" suppressed by a thrust control apparatus including a primary spring continuously biasing the thrust bearing against the rack bar, a secondary spring, and an electronic solenoid operated clutch operable to engage the secondary spring between the thrust bearing and the housing when the lateral thrust between the rack and pinion gears is high and to disengage the secondary spring from between the thrust bearing and the housing when the lateral thrust between the rack and pinion gears is low.

6 Claims, 2 Drawing Sheets

RACK AND PINION STEERING GEAR FOR MOTOR VEHICLE

TECHNICAL FIELD

This invention relates to a rack and pinion steering gear for a motor vehicle.

BACKGROUND OF THE INVENTION

A typical rack and pinion steering gear for a motor vehicle includes a housing, a rack bar having a rack gear thereon, and pinion head having a pinion gear thereon. The pinion head is supported on the housing for rotation as a unit with a steering hand wheel of the motor vehicle. The rack bar is connected at its opposite ends to steering knuckles of the motor vehicle and is supported on the housing for back and forth linear translation by a sleeve bearing around the rack bar and by a thrust bearing behind the rack bar opposite the pinion gear. The rack and pinion gears cooperate in converting manual effort applied at the steering hand wheel into linear thrust on the rack bar to steer the motor vehicle. Lateral thrust between the rack and pinion gears, i.e. thrust perpendicular to the rack bar, is maximum when the motor vehicle is steered at low speed and minimum when the motor vehicle is steered at high speed. Where the rack gear is a variable ratio rack gear, such lateral thrust is intensified in the middle of the rack gear where the ratio is lowest and may manifest itself as audible noise attributable to lateral separation between the rack and pinion gears when the pinion head is rotated back and forth. Lateral separation between the rack and pinion gears is usually suppressed by a thrust bearing spring which biases the thrust bearing into sliding engagement on the back of the rack bar. The bias of the thrust bearing spring is established by adjustment of a seat on the housing which adjustment is made when the steering gear is built and does not change during operation of the motor vehicle, i.e. is "passive". The spring seat is adjusted to yield a passive bias of the thrust bearing spring which suppresses lateral separation between the rack and pinion gears without at the same time creating enough friction between the rack bar and th e thrust bearing t o compromise performance characteristics of the steering gear such as returnability. However, because of the intensity of the lateral thrust when the rack gear is a variable ratio rack gear, the passive bias of the thrust bearing spring may not be sufficient to completely eliminate audible noise attributable to lateral separation between the rack and pinion gears.

SUMMARY OF THE INVENTION

This invention is a new and improved rack and pinion steering gear for a motor vehicle including a housing, a rack bar having a rack gear thereon, and pinion head having a pinion gear thereon. The pinion head is supported on the housing for rotation as a unit with a steering hand wheel of the motor vehicle. The rack bar is connected at its opposite ends to steering knuckles of the motor vehicle and is supported on the housing for back and forth linear translation by a sleeve bearing around the rack bar and by a thrust bearing behind the rack bar opposite the pinion gear. The rack and pinion gears cooperate in converting manual effort applied at the steering hand wheel into linear thrust on the rack bar. Lateral separation between the rack gear and the pinion gear is "actively" suppressed by a thrust control apparatus including a primary spring continuously biasing the thrust bearing against the rack bar, a secondary spring, and an electronic solenoid operated clutch operative to engage the secondary spring between the thrust bearing and the housing when the lateral thrust between the rack and pinion gears is high and to disengage the secondary spring from between the thrust bearing and the housing when the lateral thrust between the rack and pinion gears is low thereby to increase the bias on the thrust bearing only when the rack and pinion steering gear is susceptible to audible noise attributable to lateral separation between the rack and pinion gears.

DESCRIPTION OF THE PREFERRED EMBODIMENT

Figure 1:
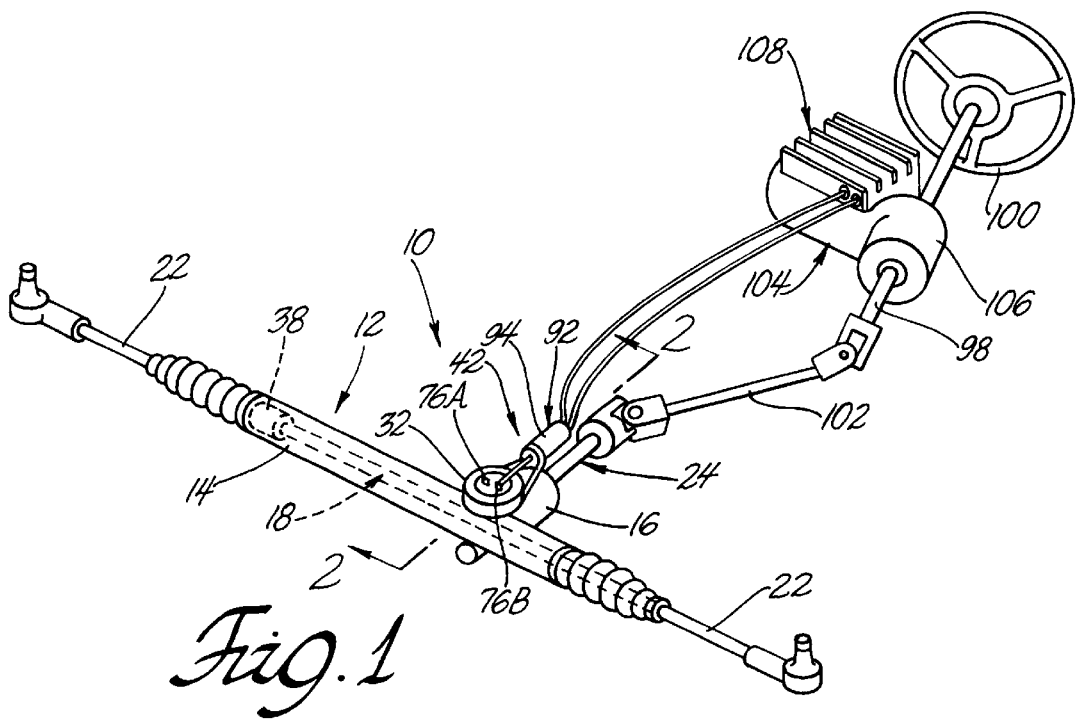
FIG. 1 is a schematic perspective view of a rack and pinion steering gear according to this invention.
Figure 2:
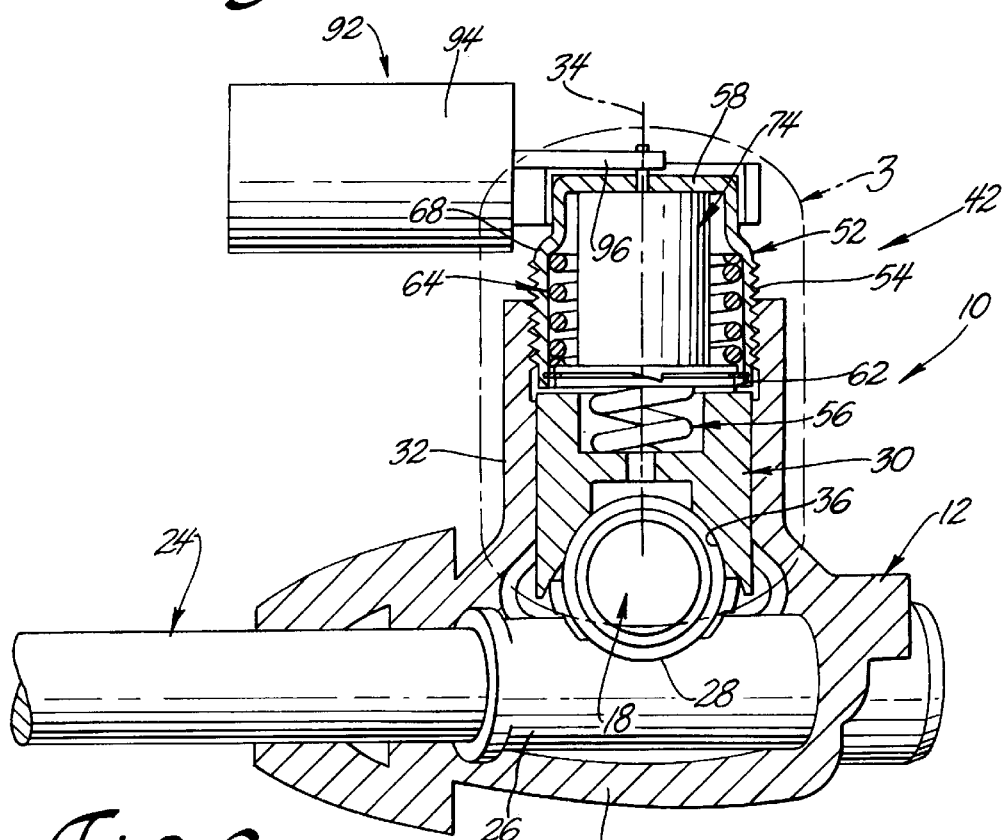
FIG. 2 is an enlarged sectional view taken generally along the plane indicated by lines 2—2 in FIG. 1.

Referring to FIGS. 1–2, a rack and pinion steering gear 10 according to this invention includes a housing 12 supported on a body, not shown, of a motor vehicle. The housing 12 includes a tubular rack bar portion 14 and a cylindrical pinion head portion 16. A rack bar 18 is disposed in the rack bar portion 14 of the housing with respective ones of its opposite ends, not shown, linked to steering knuckles, not shown, of the motor vehicle by corresponding ones of a pair of tie rods 22.

A pinion head 24 of the rack and pinion steering gear 10 is rotatably supported on the housing 12 in the pinion head portion 16 thereof and includes a schematically represented pinion gear 26 meshing with a rack gear 28 on the rack bar 18. A cylindrical thrust bearing 30 is supported in a tubular boss 32 on the steering gear housing 12 for linear translation in the direction of a longitudinal centerline 34 of the boss perpendicular to the rack bar and includes a V-shaped end 36 seated on the rack bar behind the rack gear 28 and opposite the pinion gear 26. The thrust bearing 30 cooperates with a sleeve bearing 38 on the housing 12 around the rack bar 18 in supporting the rack bar on the housing in the rack bar portion 14 thereof for back and forth linear translation.

An active lateral thrust control apparatus 42 on the steering gear housing 12 includes a cup-shaped spring seat 52 having an outside screw thread 54 thereon which cooperates with an inside screw thread in the tubular boss 32 in supporting the spring seat on the tubular boss for linear adjustment in the direction of the centerline 34 of the boss in response to rotation of the spring seat in the boss. A helical coil type primary spring 56 of the active thrust control apparatus is captured in compression flexure between a base 58 of the spring seat 52 and a recess 60 in a flat end 62 of the thrust bearing 30 opposite the V-shaped end 36 thereof. A helical coil type secondary spring 64 of the active thrust control apparatus is disposed inside of the spring seat 52 around the primary spring 56 with an outboard end 66 of the secondary spring bearing against an annular shoulder 68 on the spring seat.

An electronic solenoid operated clutch 70 of the active thrust control apparatus 42 is disposed between an inboard end 72 of the secondary spring 64 and the thrust bearing 30 and includes a tubular actuator 74 inside of the spring seat between the primary and secondary springs. The actuator 74 includes a pair of lugs 76A,76B protruding through respective ones of a pair of arc-shaped slots in the base 58 of the spring seat and an annular flange 78 having a first side 80 facing the flat end 62 of the thrust bearing around the recess 60 therein and a second side 82 facing the inboard end 72 of the secondary spring 64. A retaining ring 84 in a groove in the spring seat 52 surrounds the flange 78 on the actuator. A flat ring 86 radially overlaps both the retaining ring 84 and the flange 78 on the actuator. The inboard end 72 of the secondary spring seats on the flat ring 86 so that the secondary spring is captured in compression flexure between the retaining ring 84 and the shoulder 68 on the spring seat 52.

The flat ring 86 has a plurality of wedge-shaped cam lobes 88 thereon facing the flange 78 on the actuator. Similarly, the flange 78 on the actuator has a plurality of wedge-shaped cam follower notches 90 in the second side 82 thereof. The cam lobes 88 seat in the follower notches 90 in a retracted position of the actuator 74, FIG. 3, in which the flange 78 floats between the flat ring 86 and the flat end 62 of the thrust bearing. The actuator 74 is rotatable about the centerline 34 of the boss 32 from its retracted position to an extended position, FIG. 4, during which the cam lobes 88 are thrust out of the follower notches 90 and define a plurality of rigid struts which separate the flat ring 86 and the flange 78 in the direction of the centerline 34. As the flat ring 86 and the flange 78 separate, the side 80 of the flange bears against the flat end 62 of the thrust bearing and the flat ring separates from the retaining ring 84 so that the secondary spring becomes engaged in compression flexure between the spring seat 52 on the housing 12 and the thrust bearing 30. When the actuator 74 is rotated in the opposite direction from its extended position to its retracted position, the cam lobes 88 reseat in the cam follower notches 90 to eliminate the struts between the flat ring 86 and the flange 78 so that the flat ring reseats on the retaining ring 84 with the flange 78 floating between the thrust bearing and the flat ring.

Figure 3:
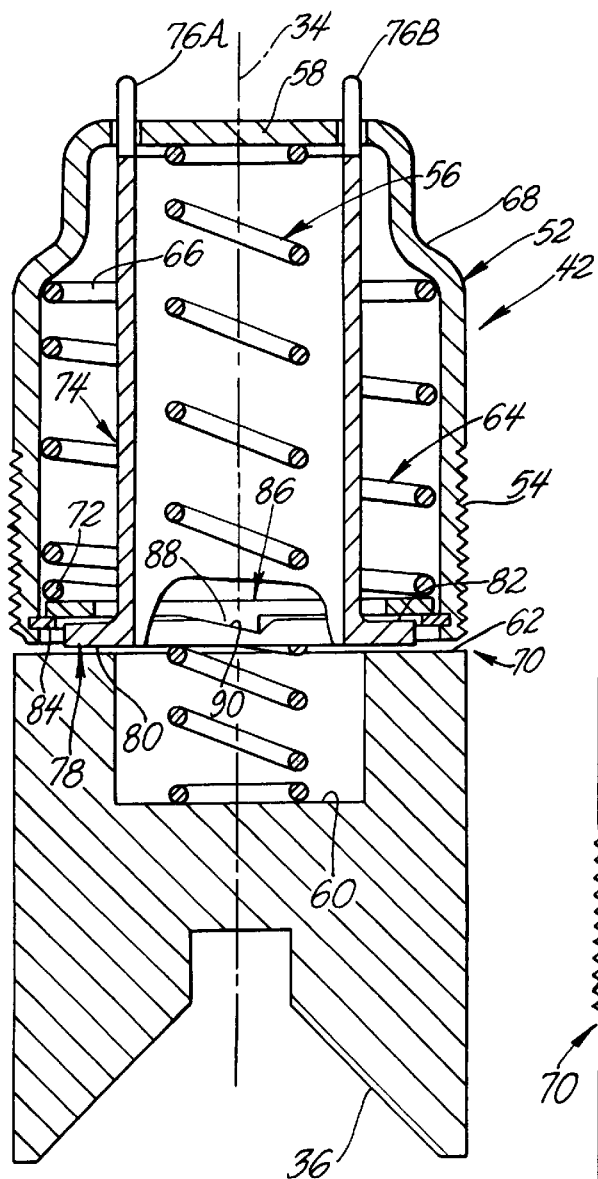
FIG. 3 is an enlarged view of the portion of FIG. 2 identified by reference circle 3 in FIG. 2.
Figure 4:
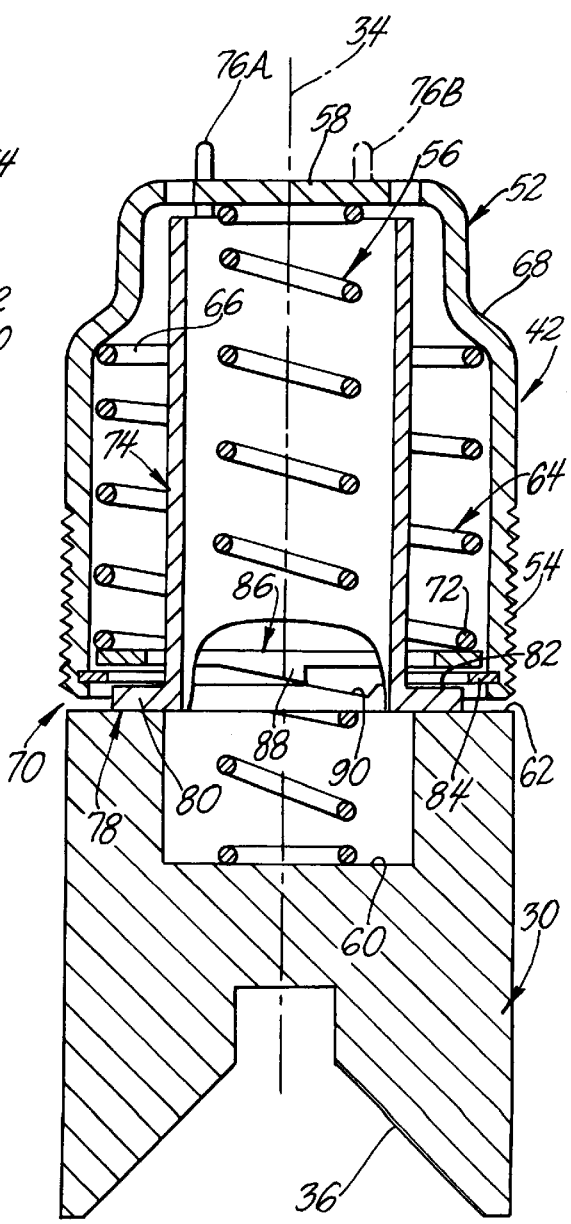
FIG. 4 is similar to FIG. 3 but showing structural elements of the rack and pinion steering gear according to this invention in different relative positions.

As seen best in FIGS. 1–3, a schematically represented electronic solenoid 92 of the electronic solenoid operated clutch 70 includes a housing 94 attached to the steering gear housing 12 and an armature shaft 96 having a distal end coupled to the lug 76B of the actuator 74 outside of the spring seat 52. The armature shaft 96 is supported on the housing 94 for back and forth linear translation between an extended position when the electronic solenoid is on and a retracted position when the electronic solenoid is off. The lug 76B cooperates with the armature shaft in converting back and forth linear translation of the armature shaft into back and forth rotation of the actuator 74 inside of the spring seat 52 from its retracted position in the retracted of the armature shaft to its extended position in the extended position of the armature shaft.

A steering shaft 98 having a steering hand wheel 100 thereon is rotatably supported on the body of the motor vehicle. An intermediate steering shaft 102 couples the steering shaft 98 and the pinion head 24 for unitary rotation. A schematically represented electric power assist apparatus 104 includes a torque sensor 106 which monitors the direction and magnitude of the manual effort applied at the steering hand wheel 100 and an electronic control module ("ECM") 108 which actuates the electric power assist apparatus to boost or supplement the manual effort applied at the steering hand wheel in accordance with the electronic signals from the torque sensor.

The steering torque at the pinion head 24 is the sum of the manual effort applied at the steering hand wheel 100 and the boost provided by the electric power assist apparatus 104 and is converted by the rack and pinion gears 28,26 into linear thrust on the rack bar to steer the motor vehicle. Lateral thrust between the pinion gear and the rack gear perpendicular to the rack bar is maximum at low vehicle speeds where maximum steering torque is required to steer the motor vehicle and minimum at high vehicle speeds where minimum steering torque is required to steer the motor vehicle. Where the rack gear 28 is a variable ratio rack gear, such lateral thrust is intensified in the middle of the rack gear where the ratio is lowest.

The torque sensor 106 provides electronic signals to the ECM 108 corresponding to the magnitude of the steering torque at the pinion head 24, i.e. to the sum of the manual steering effort applied at the steering hand wheel 100 and the boost provided by the electric power assist apparatus 104. When the magnitude of the steering torque is in a low range in which the corresponding lateral thrust between the rack gear 28 and the pinion gear 26 is similarly low, the ECM turns off the electronic solenoid 92. With the electronic solenoid off, the armature shaft 96 and the actuator 74 are each in their retracted positions. In this circumstance, only the primary spring 56 is captured in compression flexure between the spring seat 52 and the thrust bearing 30 and urges the thrust bearing against the rack bar with a bias determined by rotary adjustment of the spring seat in the tubular boss 32.

When the magnitude of applied steering torque is in a high range in which the corresponding lateral thrust between the rack gear 28 and the pinion gear 26 is similarly high, the ECM turns on the electronic solenoid. With the electronic solenoid on, the armature shaft 96 and the actuator 74 are each in their extended positions. In this circumstance, both the primary spring 56 and the secondary spring 64 are captured in compression flexure between the spring seat 52 and the thrust bearing 30 and urge the thrust bearing against the rack bar with a bias attributable to both springs and significantly greater than the bias of the primary spring alone.

Steering torque is in the low range when the motor vehicle is driven at speeds characteristic of highway driving. With the torque sensor 106 signaling the ECM 108 to turn off the electronic solenoid 92, the secondary spring is disengaged from between the spring seat 52 and the thrust bearing 30 so that only the primary spring biases the thrust bearing against the rack bar. The spring seat 52 is adjusted in the tubular boss 32 when the steering gear 10 is built to yield a bias by the primary spring on the thrust bearing that is sufficient to suppress lateral separation between the rack and pinion gears 28,26 without at the same time inducing so much friction between rack bar and the thrust bearing that performance characteristics of the steering gear 10 such as returnability are degraded.

Steering torque is in the high range when the motor vehicle is driven at low speeds characteristic of maneuvering in a parking lot. With the torque sensor 106 signaling the ECM 108 to turn on the electronic solenoid 92, the clutch 70 engages the secondary spring 64 between the spring seat 52 and the thrust bearing 30 so that both the primary and the secondary springs bias the thrust bearing against the rack bar. The significantly increased bias on the thrust bearing resists the higher lateral thrust between the rack and pinion gears 28,26 in the high range of steering torque to suppress audible noise attributable to lateral separation between the rack and pinion gears. The increased friction between the rack bar and the thrust bearing attributable to the increased bias on the thrust bearing does not affect the performance of the steering gear 10 because the boost provided by the electric power assist apparatus 104 simply overpowers the friction as the motor vehicle is being steered.

At low vehicle speed, when the steering hand wheel 100 is released for return to straight ahead driving, steering torque quickly reverts to the low range and the torque sensor 106 signals the ECM 108 to turn off the electronic solenoid 92. The electronic solenoid operated clutch 70 then disengages the secondary spring from between the thrust bearing and the rack bar so that returnability is not degraded by friction attributable to the bias of the secondary spring.

What is claimed is:

1. A motor vehicle rack and pinion steering gear including:
    a housing,
    a rack bar supported on the housing for back and forth linear translation having a rack gear thereon,
    a pinion head rotatably supported on the housing having a pinion gear thereon meshing with the rack gear, and
    a thrust bearing supported on the housing for linear translation perpendicular to the rack bar and slidably engaging the rack bar behind the rack gear opposite the pinion gear,
    characterized in that the rack and pinion steering gear further includes an active lateral thrust control apparatus comprising:
    a spring seat means on the housing,
    a primary spring disposed in compression flexure between the spring seat means and the thrust bearing resiliently biasing the thrust bearing against the rack bar to suppress lateral separation between the rack gear and the pinion gear in a low range of steering torque between the pinion gear and the rack gear,
    a secondary spring bearing against the spring seat, and
    a clutch means operable to engage the secondary spring between spring seat and the thrust bearing in a high range of steering torque between the pinion gear and the rack gear to supplement the bias of the primary spring on the thrust bearing and suppress lateral separation between the rack gear and the pinion gear and to disengage the secondary spring from between spring seat and the thrust bearing in the low range of steering torque between the pinion gear and the rack gear.

2. The motor vehicle rack and pinion steering gear recited in claim 1 wherein:
    each of the primary spring and the secondary spring is a helical coil spring and the secondary spring is disposed around the primary spring with an outboard end thereof bearing against the spring seat means.

3. The motor vehicle rack and pinion steering gear recited in claim 2 wherein the spring seat means comprises:
    a cup-shaped spring seat supported on the housing for adjustable translation perpendicular to the rack bar to adjust the magnitude of the resilient bias of the primary spring on the thrust bearing.

4. The motor vehicle rack and pinion steering gear recited in claim 3 wherein the clutch means comprises:
    a retaining ring on the spring seat,
    a flat ring between the retaining ring and an inboard end of the secondary spring radially overlapping the retaining ring so that the secondary spring is captured in compression flexure between the retaining ring and the spring seat,
    a tubular actuator between the primary spring and the secondary spring having an annular flange inside of the retaining ring between the thrust bearing and the flat ring,
    a cam means operative in response to rotation of the actuator relative to the flat ring from a retracted position thereof to an extended position thereof to interpose a strut between the flat ring and the flange on the actuator which separates the flat ring from the retaining ring and seats the flange on the actuator against the thrust bearing so that the secondary spring becomes captured in compression flexure between the spring seat and the thrust bearing, and
    an electronic solenoid means operative to rotate the actuator from the retracted position thereof to the extended position thereof.

5. The motor vehicle rack and pinion steering gear recited in claim 4 wherein the cam means comprises:
    a plurality of wedge-shaped cam lobes on a first one of the flat ring and the flange on the actuator, and
    a corresponding plurality of wedge-shaped follower notches in a second one of the flat ring and the flange on the actuator,
    the wedge-shaped cam lobes being seated in respective ones of the wedge-shaped follower notches in the retracted position of the actuator and being thrust out of the follower notches and defining the struts between the flat ring and the flange on the actuator in response to rotation of the actuator relative to the flat ring from the retracted position thereof to the extended position thereof.

6. The motor vehicle rack and pinion steering gear recited in claim 5 wherein the electronic solenoid means comprises:
    an electronic solenoid supported on the housing of the steering gear having a housing and an armature shaft supported on the housing of the electronic solenoid for back and forth linear translation between an extended position when the electronic solenoid is on and a retracted position when the electronic solenoid is off, and
    a lug on the actuator coupled to a distal end of the armature shaft and cooperating therewith in rotating the actuator from the retracted position thereof to the extended position thereof concurrent with linear translation of the armature shaft from the retracted position thereof the extended position thereof.

* * * * *